Nov. 24, 1936.　　　　R. K. LEE　　　　2,062,007
AUTOMATIC TRANSMISSION RESTORING APPARATUS
Filed Sept. 25, 1933
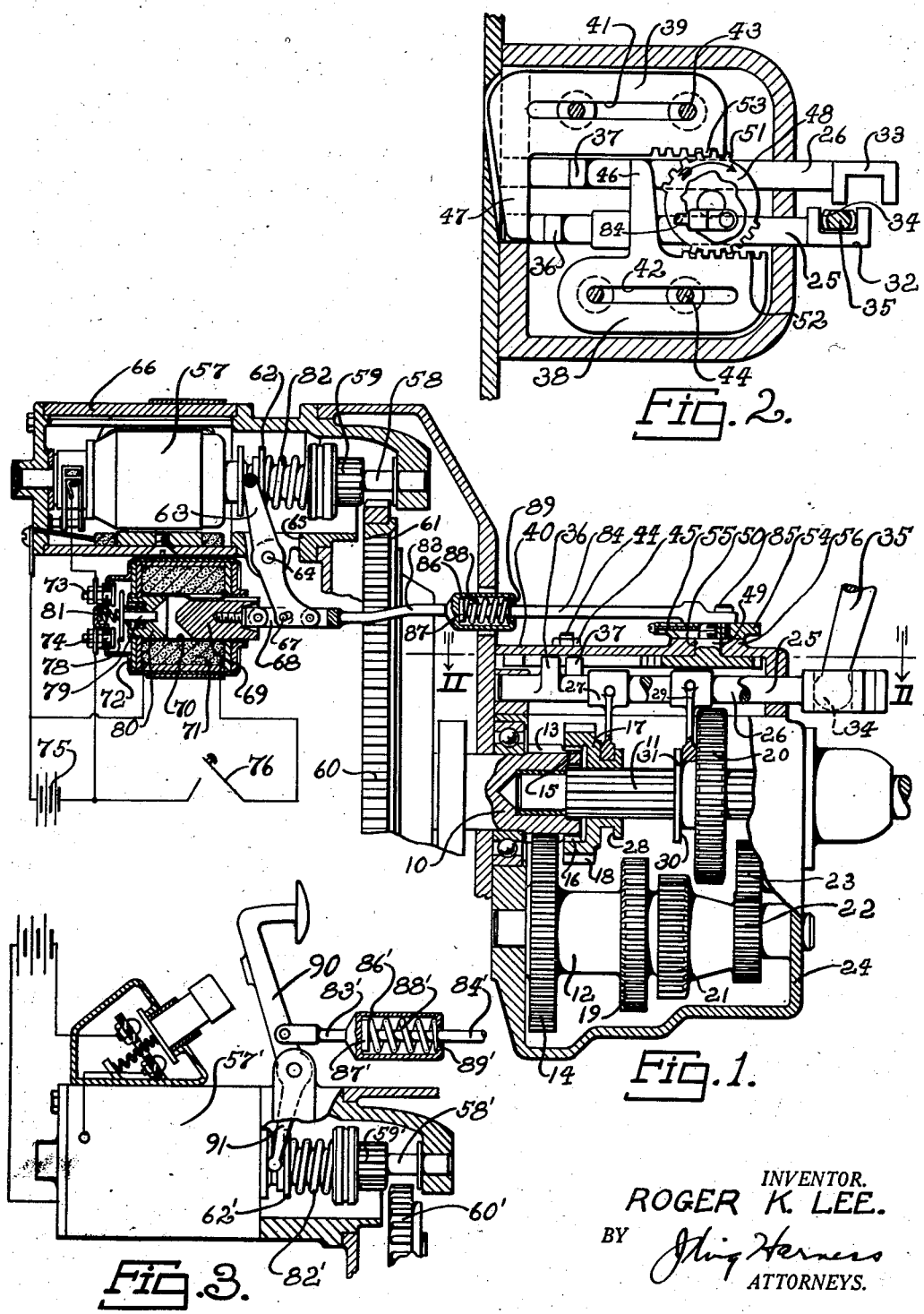
INVENTOR.
ROGER K. LEE.
BY
ATTORNEYS.

Patented Nov. 24, 1936

2,062,007

UNITED STATES PATENT OFFICE 2,062,007

AUTOMATIC TRANSMISSION RESTORING APPARATUS

Roger K. Lee, Highland Park, Mich., assignor to Chrysler Corporation, Detroit, Mich., a corporation of Delaware Application September 25, 1933, Serial No. 690,843

10 Claims. (Cl. 123—179)

This invention relates to variable speed vehicle transmissions and particularly to apparatus for automatically bringing the diverse gears and clutch elements of a vehicle transmission into their neutral positions when the engine with which the transmission is associated is cranked by operation of its starting mechanism.

It is not uncommon for an operator of a vehicle to bring the starting mechanism thereof into operation while the transmission is in gear. If the engine is started under this condition the vehicle unexpectedly lunges either forwardly or rearwardly, depending upon the setting of the transmission gears. This unexpected movement of the vehicle frequently causes severe personal injury, as well as property damage. The tendency to allow the mechanism to remain in gear from the time the vehicle is parked until the engine thereof is started again is materially increased by the presence of automatic clutch operating mechanism and full and semi-automatically operated transmissions with which some modern vehicles are now provided. Automatic devices of this character render it unnecessary for an operator to place the transmission in a neutral condition before releasing the clutch pedal and while the engine is running, and therefore nothing remains to prompt him to place the transmission in a neutral state when operation of the vehicle is terminated and the engine is stopped.

The main objects of the invention are to provide apparatus which is adapted to automatically bring any gear or clutch element of a vehicle transmission, which happens to be in a driving relation when the vehicle is stopped and its engine is inoperative, into a neutral position before the starting mechanism of the vehicle is actuated; to provide apparatus of this kind which positively maintains the various gears and clutch elements of a transmission in neutral state while the starting apparatus is energized; to provide means of this character which is energized during the initial movement of the starting mechanism control member; to provide a neutral condition restoring apparatus for a vehicle transmission which is adapted to operate successfully in conjunction with starting mechanism having mechanically or electrically operated clutches or starting mechanism of the "Bendix" type; to provide apparatus of this kind which can be relied upon to maintain a semi or full automatic transmission in neutral state during engine starting operations; and to provide simple and inexpensive neutral restoring apparatus which does not interfere with the normal operation of the transmission with which it is associated or require radical changes in the conventional construction thereof.

An illustrative embodiment of my invention is shown in the accompanying drawing, in which:

Fig. 1 is a vertical sectional view of an engine starting system and vehicle transmission mechanism showing my improved apparatus for restoring the transmission to a neutral condition and illustrating one form of means for actuating the apparatus in timed relation with the starting system.

Fig. 2 is a longitudinal horizontal sectional view taken on the line II—II of Fig. 1.

Fig. 3 is a side elevation, partly in section, of a somewhat different type of starting system than that shown in Fig. 1, illustrating one manner in which such a starting mechanism can be connected with apparatus for restoring transmission mechanism to a neutral state.

My improved neutral condition restoring apparatus is illustrated in conjunction with a vehicle power unit which includes a selective type variable speed transmission and an engine starting system. The transmission mechanism includes aligned driving and driven shafts 10 and 11, respectively, and a countershaft 12 provided with a rotatbly mounted cluster gear. Formed on the driving shaft 10 of the transmission are pinion teeth 13 which are permanently meshed with a gear 14 of the countershaft 12. The right end portion of the driving shaft 10 is provided with a series of clutch teeth 15 which are adapted to mesh with internal clutch teeth 16 of a shiftable clutch element 17 that is splined on the driven shaft 10 for establishing a direct drive between the driving and driven shafts 10 and 11 respectively. The shiftable clutch element 17 is provided with external gear teeth 18 which are adapted to mesh with the teeth of a gear 19, formed integral with the countershaft 12, for producing an intermediate or second speed driving relation through the countershaft from the driving shaft 10 to the driven shaft 11. Splined on the driven shaft 11 is a shiftable gear 20 having teeth thereon which are engageable with the gear teeth 21 on the countershaft 12 for establishing a low speed driving relation between the driving and driven shafts when the gear 20 is shifted to the left, as viewed in Fig. 1. The countershaft 12 is also provided with reverse pinion teeth 22 which are permanently meshed with a reverse gear 23 with which the shiftable gear 20 is engageable when the latter is shifted to the right, as viewed in Fig. 1, for establishing a reverse driving relation between the driving and driven shafts 10 and 11 respectively.

All of the above mentioned transmission mechanism is enclosed within a casing 24 in the upper end of which is slidably mounted a pair of shifter bars 25 and 26. The shifter bar 25 carries a gear shifter fork 27 which is received in a groove 28 formed in the shiftable clutch element 17, and the shifter bar 26 is provided with a shifter fork 29 which extends into a groove 30 formed in a hub 31 extending axially from one side of the shiftable gear 20. The shifter bars 25 and 26 are provided with facing notches 32 and 33 respectively, in which the lower end portion or knob 34 of a gear shift lever 35 is selectively receivable. Upwardly extending lugs 36 and 37 are integrally formed on the shifter bars 25 and 26 respectively.

The neutral condition restoring apparatus embodying my invention includes a pair of plates 38 and 39, one arranged at each side of the shifter bars 25 and 26 in a space provided within the transmission casing adjacent the top wall 40 thereof. The plates 38 and 39 are provided with elongated slots 41 and 42 through which bolts 43 and 44, respectively, extend. The bolts 44 may be threaded in the top wall 40 of the transmission casing or otherwise secured thereto in any suitable manner, such as by nuts, as illustrated at 45. Formed on the shiftable plates 38 and 39 are inwardly extending fingers 46 and 47, respectively, one disposed on each side of the lugs 36 and 37. These fingers are engageable with the lugs 36 and 37 when the latter are displaced from the positions thereof corresponding to the neutral position of the clutch element 17 and shiftable gear 20.

Mechanism is provided for simultaneously moving the shiftable plates 38 and 39 in respectively opposite directions so as to urge the fingers 46 and 47 of the plates toward each other and to thereby return either shifter bar which happens to be displaced from its neutral position to such position. This mechanism includes a pinion 48 having a hub portion 49 journaled in an aperture 50 in the top wall 40 of the transmission casing. The pinion 48 is provided with teeth 51 which are permanently meshed with rack teeth 52 and 53 formed on the adjacent edges of the plates 38 and 39, respectively. The pinion 48 is held against inward movement relative to the transmission casing by a disc 54 which is nonrotatably fixed to an external part of the hub portion 49 of the pinion by a set screw 55. The lower side of the disc 54 bears upon an end face provided on a boss 56 integrally formed on the top wall 40 of the transmission casing. The driving pinion 48 of my improved neutral restoring apparatus may be operatively connected in any suitable manner with the starting mechanism of the power unit so as to turn the pinion in a clockwise direction, as viewed in Fig. 2, prior to cranking of the engine by the starting system.

In the form shown in Fig. 1, the starting system includes a starting motor 57 having a shaft 58 on which a pinion 59 is splined or otherwise shiftably mounted so as to be engageable with and disengageable from a starting gear 60 provided on the flywheel 61 of the motor. Mounted on the shaft 58 of the motor is a shiftable collar 62 in which are received the end portions of a forked lever 63 pivotally mounted at 64 upon an extension 65 of the motor housing 66. The lower end of the forked lever 63 is pivotally attached at 67 to a link 68 which is in turn pivotally connected with a solenoid core 69. The solenoid core is slidably mounted in a sleeve 70 about which a magnetic coil 71 is wound. The magnetic coil and solenoid are supported by a casing 72 which may be rigidly attached to any suitable structure of the internal combustion engine unit. Mounted on the left end of the solenoid casing 72 is a pair of contact elements 73 and 74, each of which is insulated from the structure of the casing and from each other. These contacts are connected in series with the starting motor 58 and with a battery 75 and switch 76 by a circuit in which the coil 71 of the solenoid is also included.

A shiftable contact element 78 having a stem 79 slidably mounted in an apertured plug 80 seated in the left end of the sleeve 70 is provided for closing the circuit through the contact elements 73 and 74. The shiftable contact element registers with the contacts 73 and 74 and is normally held out of engagement therewith by a spring 81 which bears between the left end of the solenoid casing 72 and the central portion of the shiftable contact member. When the switch 76 is closed the solenoid coil 71 is energized and it moves the solenoid core 69 to the left, as viewed in Fig. 1, bringing its extremity into engagement with the stem 79 of the shiftable contact 78. Further leftward movement of the solenoid moves the shiftable contact element 78 into engagement with the contact elements 73 and 74, thereby closing the motor circuit. This movement of the solenoid core simultaneously turns the forked lever 63 in a clockwise direction and shifts the collar 62 to the right, as viewed in Fig. 1. The collar 62 bears upon a spring 82 which in turn engages the pinion 59 and yieldably urges the latter into a meshed engagement with the starter gear 60.

My improved apparatus for restoring the transmission to a neutral state is operatively connected with the starting mechanism by rods 83 and 84 which are pivotally attached to the forked lever 63 of the starting mechanism and to the rotatable disc 54 of the neutral condition restoring apparatus, respectively. The right end of the rod 84 is journaled on a bolt 85 which is eccentrically mounted on the disc 54 and the two rods are connected together by a lost motion coupling including a tubular member 86 on the rod 83 having a restricted open end through which the rod 84 extends. The rod 84 is provided with an enlarged head 87 which engages the inner end of a coil spring 88 located within the tubular member 86. The other end of the coil spring abuts against an inwardly extending flange 89 surrounding the restricted opening of the tubular member 86. The spring 88 is so constructed and arranged that the initial movement of the forked lever 33 causes the disc 54 to be turned in a clockwise direction, as viewed in Fig. 2, thereby urging the fingers 47 and 46 inwardly toward each other. One of the fingers 46 or 47 engages either of the projections 36 or 37 which happen to be out of a neutral position and returns the same to such position. Further actuation of the starter control mechanism is permitted by the spring 88 which allows relative movement of the rods 83 and 84 after the fingers 47 and 46 have reached their innermost positions.

In Fig. 3 of the drawing is illustrated mechanism by which my improved neutral condition restoring apparatus may be operatively connected with a starting system having a manually operable clutch. This starting system includes a starting motor 57' having a shaft 58' upon which a pinion 59' is splined or otherwise slidably mounted. The pinion 59' is adapted to be selectively engaged with the teeth of a starter gear 60' by clutch operating mechanism including a pedal 90 having a forked lower extremity 91 engaged in a groove of a collar 62' which is shiftably mounted on the shaft 58'. During counterclockwise rotation of the pedal 90 the collar 62' bears upon a coil spring 82' mounted on the shaft 88' which in turn urges the pinion 59' into mesh with the gear 60'.

The pedal 50 may be operatively connected with my improved neutral restoring apparatus by a pair of rods 83' and 84' connected together by a lost motion coupling which includes a tubular member 86' rigidly secured to the rod 83' and having a restricted end opening in which the rod 84' is received. The rod 84' is provided with an enlarged head 87' which engages the inner end of a spring 88' located within the tubular member 86'. The other end of the spring 88' engages an inwardly extending flange 89' surrounding the opening through which the rod 84' extends. The spring 88' is so constructed and arranged as to cause a member like that shown at 54 in Fig. 2, with which the rod 84' is adapted to be pivotally connected in the manner illustrated in Figs. 1 and 2, to turn in a clockwise direction so as to move the fingers 46 and 47 of the neutral restoring apparatus inwardly toward each other during the initial depression of the pedal 90. Further depression of the pedal 90 after the fingers have reached their innermost positions is accommodated by the spring 88' which permits relative movement of the rods 83' and 84'.

The above described apparatus not only positively returns the variable speed clutch elements or gears of the transmission to their neutral positions prior to engagement of the starter pinion and starting gear, but it also positively maintains the variable speed elements of the transmission in their neutral positions during the entire cranking operation. This is accomplished independently of the normal transmission control member or gear shift lever 35. With a vehicle equipped with this apparatus it is absolutely impossible for the transmission to be accidentally left in gear during cranking operations.

Although but several specific embodiments of my invention are herein shown and described, it will be understood that various changes in the size, shape, and arrangement of parts may be made without departing from the spirit of my invention, and it is not my intention to limit its scope other than by the terms of the appended claims.

What I claim is:

1. The combination with a vehicle having an engine starting system and having transmission mechanism including a plurality of variable gear ratio changing elements and including means having a normal control member for selectively rendering the latter operative or inoperative, of apparatus associated with said transmission mechanism for bringing said elements into inoperative positions independently of said normal control member, and mechanism operatively connected with said starting system for actuating said apparatus when said starting system is energized so as to assure the placement of all of said elements in inoperative positions prior to cranking of said engine by said starting system.

2. The combination with a vehicle having an engine starting system and selective type variable speed transmission mechanism including relatively shiftable reverse and diverse forward speed establishing elements and normal control means therefor provided with an operating member, of apparatus associated with said control means for bringing said elements into inoperative positions independently of said operating member, and means interconnected between said apparatus and said starting system operable by the latter and adapted to actuate said apparatus to shift any of said elements from an operative to an inoperative position during actuation of said starting system.

3. In a vehicle having an engine starting system, transmission mechanism having relatively shiftable reverse and forward speed changing elements, a pair of reciprocable shifter bars for controlling said elements, and apparatus operable by said starting system during the initial stages of actuation thereof for placing said elements in their inoperative positions, said apparatus including a pair of members each engageable with one of said shifter bars when the latter are displaced from their neutral positions and one movable in one direction and the other in an opposite direction by said starting system.

4. In a vehicle having an engine starting system, transmission mechanism including a housing having relatively shiftable reverse and forward speed changing elements therein, a pair of reciprocable shifter bars slidably mounted in said housing and each associated with some of said elements for controlling the latter, said bars being shiftable in respectively opposite directions from their neutral positions for moving the speed changing elements associated therewith to operative positions, a pair of shiftable members slidably mounted in said housing in close proximity to said shifter bars, said members being engageable with said bars when the latter are displaced from their neutral positions, and means cooperating with said members for simultaneously moving the latter in respectively opposite directions, said means being operable by said engine starting system.

5. In a variable speed transmission, a plurality of relatively shiftable speed changing elements, means for engaging and disengaging said speed changing elements including a normal control member, and means for restoring any of said elements to their neutral positions independently of said normal control member including a pair of relatively shiftable bars having fingers thereon engageable with said means, and mechanism for simultaneously moving said bars in respectively opposite directions.

6. In a variable speed transmission, reverse and variable forward speed establishing elements, a pair of shifter bars, one operatively connected with said reverse establishing element and one of said forward speed establishing elements, the other being operatively connected with other forward speed establishing elements, lugs on said bars, normal control means for reciprocating said bars in opposite directions so as to selectively bring either of said elements into an operative condition, a pair of shiftable members having protruding parts engageable with said lugs and adapted to move said bars to positions corresponding to the neutral positions of said elements independently of said normal control means, and means for simultaneously moving said shiftable members in respectively opposite directions.

7. In a vehicle having an engine starting system including an operating member, a pair of shifter bars, one operatively connected with said reverse establishing element and one of said forward speed establishing elements, the other being operatively connected with other forward speed establishing elements, lugs on said bars, normal control means for reciprocating said bars in opposite directions so as to selectively bring either of said elements into an operative condition, a pair of shiftable members having protruding parts engageable with said lugs and adapted to move said bars to positions corresponding to the neutral positions of said elements independently of said normal control means, and means operable by the operating member of said starting system for simultaneously moving said shiftable members in respectively opposite directions so as to simultaneously move the protruding parts thereof toward the neutral positions of said lugs during actuation of said starting system.

8. In a vehicle, a variable speed transmission mechanism including means for normally varying the latter, a normal control member for said means, an engine starting system, and apparatus including relatively movable members having a yieldable connection therebetween operable independently of said normal control member and interconnected directly between said starting system and said means for bringing said transmission mechanism to a neutral condition as said starting system is energized.

9. In a vehicle; a variable speed transmission device including means for normally varying the latter, a normal control member for said means, mechanism for actuating said means independently of said normal control member; an engine starting system including an electric motor, disengageable driving means, and electrically actuated control means for operating said disengageable driving means; and apparatus operable independently of said normal control member and interconnected directly between said mechanism and said electrically actuated control means and operable by the latter for bringing said transmission device to a neutral position during movement of said disengageable driving means toward its engaged position.

10. In a vehicle; a variable speed transmission device including means for normally varying the latter, a normal control member for said means, mechanism for actuating said means independently of said normal control member; an engine starting system including an electric motor, disengageable driving means, and manually actuated control means for operating said disengageable driving means; and apparatus operable independently of said normal control member and interconnected directly between said mechanism and said manually actuated control means and operable by the latter for bringing said transmission device to a neutral position during movement of said disengageable driving means toward its engaged position.

ROGER K. LEE.